(12) United States Patent
Yamashita et al.

(10) Patent No.: US 6,768,558 B1
(45) Date of Patent: Jul. 27, 2004

(54) PRINTED MATTER INCLUDING INVISIBLE INFORMATION AND PRINTING SYSTEM

(75) Inventors: Taichiro Yamashita, Tsuchira (JP); Takeshi Shibuya, Chiyoda (JP); Junichi Matsuno, Tsuchira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/531,452

(22) Filed: Mar. 20, 2000

(30) Foreign Application Priority Data

Nov. 16, 1999 (JP) .......................... 11-325046

(51) Int. Cl.⁷ ............................ G06F 15/00; G09C 3/00; G06K 9/00
(52) U.S. Cl. ....................... 358/1.18; 358/1.9; 358/328; 358/3.01; 358/530; 283/74; 283/94; 382/181; 382/183
(58) Field of Search ............................... 358/1.18, 1.9, 358/501, 3.28, 3.01, 530; 382/181, 183, 184, 203, 291, 294, 284; 283/72, 94, 113, 73, 84, 98, 99, 100, 109–111; 428/201; 380/201, 245

(56) References Cited

U.S. PATENT DOCUMENTS 5,146,344 A  *  9/1992 Bennett et al. ............. 358/296
6,104,812 A  *  8/2000 Koltai et al. ................ 283/113
6,296,281 B1 * 10/2001 Stone .......................... 283/93
6,317,226 B1 * 11/2001 Yeh et al. .................... 283/72

OTHER PUBLICATIONS

JP-A-11-168616.

JP-A-6-40190.

"Basics of Digital Watermarks", by Kineo Matsui, pp. 22–26, 1998, Morikita Publishing Co.

* cited by examiner

*Primary Examiner*—Twyler Lamb
(74) *Attorney, Agent, or Firm*—Antonelli, Terry, Stout & Kraus, LLP

(57) ABSTRACT

To invisibly embed additional information in a base pattern and to visualize the additional information, a dislocation is provided in a boundary between the base pattern compose of striped thin lines and the additional information pattern composed of striped thin lines. This dislocation makes the stripes of the patterns discontinuous. The additional information pattern is invisibly embedded in the base pattern such that a sequence of dislocations in the stripes forming the boundary is at an angle equal to or larger than a predetermined angle with respect to the stripe direction.

32 Claims, 13 Drawing Sheets

PRINTED MATTER INCLUDING INVISIBLE INFORMATION AND PRINTING SYSTEM

BACKGROUND OF THE INVENTION

The present invention relates to a printed matter including invisible information that is generated by printing an invisible information pattern on the base pattern of the printed matter and that can be visualized for visual identification by putting a reference pattern, corresponding to the base pattern, on the printed matter.

Recently, as more data has become digitized and more digital information has become accepted, various technologies for digital signatures and digital watermarks are being studied. These technologies allow copyright information or other attribute information to be added to digital information as invisible information. A method, called a techniques for embedding secret information, is used as an implementation of these technologies. This technology, used to embed additional information into main image information as invisible information, is useful in preventing copyrighted image data such as pictures, bills, and notes from being copied or altered.

For example, JP-A-11-168616 discloses a method for implementing this technology. In this method, image information to be embedded is created from additional information composed of characters and images and, from the image information to be embedded, combined image information is created by modulating the predetermined pattern image information. The combined image information is then recorded on a non-electronic medium such as a paper.

Another method is described in "Basics of Digital Watermarks", by Kineo Matsui, pp. 22–26, 1998, Morikita Publishing Co. This method converts the shade of an image to micro-pattern density information to represent monochrome gray scale picture information and so on. It overlaps one micro-pattern on another to make watermark information visible. For example, in a part where information in a predetermined shape such as character information is present, the method inverts monochrome information for reproducing intermediate colors between white and black and prints it as invisible information on a medium such as a paper. On the other hand, the monochrome information, which is not inverted, is printed on a non-electronic medium such as a transparent film. Then, this method physically puts the transparent film on the paper to cause invisible information part, such as the shade of the character area, to be distinguished from other parts to allow invisible information to be made visible.

JP-A-6-40190 discloses an ID card that prevents counterfeiting. A transparent film with special thin lines or a net pattern, or a lenticular film with a special frequency, is put this ID card. This structure causes at least two sets of thin-line or net patterns, each generating its own moiré, to appear in different areas.

To extract invisible information from a non-electronic medium, such as a paper, using the method disclosed in JP-A-11-168616, a mask sheet with the size and the resolution equal to those of the combined image information must be put physically on the combined image information. By doing so, the invisible information is visualized and decoded and the embedded information is reproduced. However, this requires the user to position mask sheet precisely on the combined image information. For precise positioning, the method disclosed in the above-mentioned publication requests that positioning marks be recorded on combined image information. However, putting a mask sheet precisely on combined image information requires the user to use a special positioning apparatus or to manually position the mask sheet on the combined image information carefully and slowly. This work is not easy to do.

The method described in "Basics of Digital Watermarks", by Kineo Matsui, pp. 22–26, 1998, Morikita Publishing Co. also requires the user to put a mask sheet on combined image information precisely to a precision of a macro-pattern cell to visualize embedded information. Thus, visualizing embedded invisible information requires the user to use a special positioning apparatus or to manually position the mask sheet on the composite image information carefully and slowly. This work is not easy to do.

The counterfeit-prevention ID card disclosed in JP-A-6-40190 has at least two sets of different thin line or net patterns. Their frequencies are made to vary to such an extent that human beings cannot detect, or the patterns are placed such that they are not virtually parallel. Means is disclosed for visually checking the validity of the card by putting a film (identification film) with a predetermined frequency on the card to generate a unique moiré for comparing the relative relation. With at least two different patterns arranged separately, this means compares a moiré, generated by putting the identification film on the card, with a moiré, generated by putting the identification film on the real card, to validate the card. However, means for obtaining invisible information from a thin line pattern or a net pattern is not disclosed. Neither is disclosed a method for making the boundary between at least two separate thin line or net patterns difficult to identify.

SUMMARY OF THE INVENTION

It is therefore an object of the present invention to provide a printed matter in which additional information may be invisibly embedded in a base pattern forming the ground pattern and which allows the invisible information to be made visible by putting on the base pattern an identification film or a reference pattern printed on a transparent film.

To solve the problems described above, a printed matter according to the present invention comprises a base pattern formed of stripes at a predetermined interval; and an additional information pattern having information to be added to the base pattern, the information being a pattern of stripes at the predetermined interval of the base pattern, wherein a boundary between the base pattern and the additional information pattern has a predetermined dislocation between the striped pattern of the base pattern and the striped pattern of the additional information pattern and wherein the boundary is at an angle equal to or larger than a predetermined angle.

In addition, the printed matter according to the present invention is a printed matter printed with a digital printer, and an amount of the dislocation in the boundary between the base pattern and the additional information pattern is a minimum unit of resolution of the digital printer.

Still further advantages of the present invention will become apparent to those of ordinarily skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purposes of limiting the same, and wherein.

DESCRIPTION OF THE EMBODIMENTS

Figure 1:
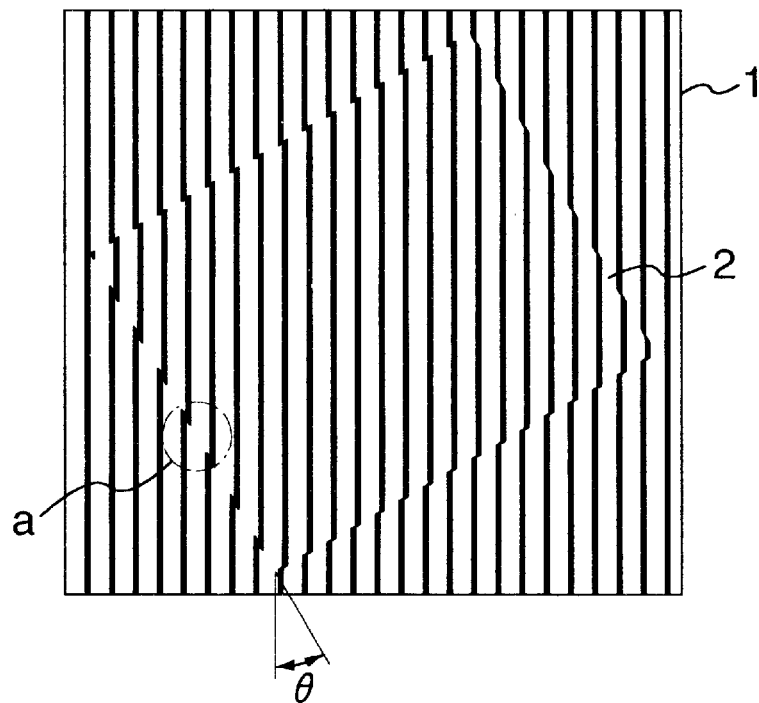
FIG. 1 is a diagram showing an example of a printed matter including invisible information according to the present invention.

Some embodiments of the present invention will be described in detail with reference to FIG. 1 to FIG. 13. FIG. 1 is a diagram showing an embodiment of the present invention. This figure shows additional information (a slanted rectangular in this embodiment) that is put on a striped thin-line pattern that is the base pattern of a printed matter including invisible information. The additional information is also a thin-line pattern similar to that of the base pattern.

In FIG. 1, a base pattern 1 is a striped pattern. Numeral 2 denotes an additional information pattern, an invisibly embedded rectangle slanted at an angle of θ. Both the base pattern 1 and the additional information pattern 2 are a fine stripe (thin-line) pattern. The base pattern 1 and the additional information pattern 2 have the same solid line width and the same pitch between each two lines. In addition, the base pattern and the additional information pattern are arranged such that there is a dislocation in the striped positions in the boundary between the two patterns. Note that the striped pattern forming the base pattern 1 and the additional information pattern 2 may be composed of solid thin lines or dotted lines as long as they form a striped pattern as a whole.

For purpose of illustration, FIG. 1 shows a rather extreme or exaggerated striped pattern so that stripes can be visually understood. Actually, however, when the striped pattern is printed with a 600 dpi (600 lines/inch (2.54 cm)) printer with the width of a black line set to 0.08 mm (corresponding to two lines) and the pitch between each two black lines set to 0.254 mm (corresponding to six lines), the base pattern 1 and the additional information pattern 2 are identified as evenly gray.

Figure 2:
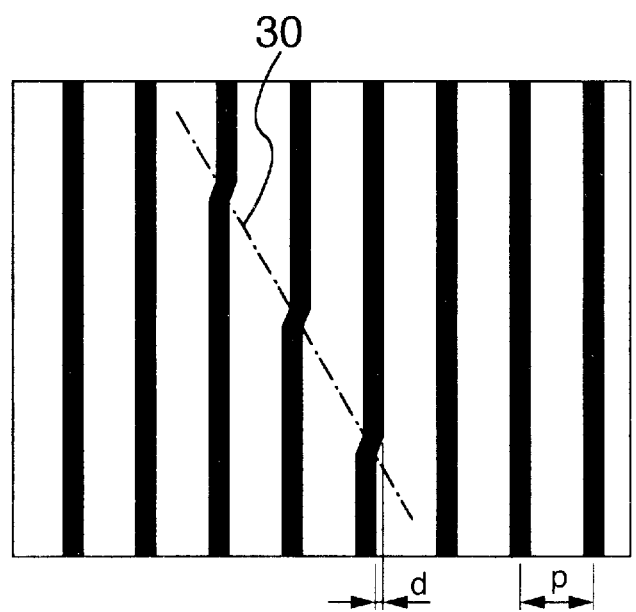
FIG. 2 is a diagram showing the close-up of a detailed striped pattern according to the present invention.

FIG. 2 is a close-up of the boundary, shown as part a in FIG. 1, between the base pattern 1 and the additional information pattern 2. An alternate long and short dash line 30 in FIG. 2, which shows the boundary between the base pattern 1 and the additional information pattern 2, is not present on the actual printed matter. Referring to FIG. 2, the thin lines are printed with a 600 dpi digital printer as described above. As an example, the width of the black line is 0.08 mm corresponding to two lines, the pitch p between each two black lines is 0.254 mm corresponding to six lines, and the dislocation d in the boundary is 0.04 mm corresponding to one line (that is, 1/600 inch (2.54 cm)) that is the minimum width the digital printer can be process. The digital printer prints the dislocation d, which is as small as 0.04 mm in width, as a smooth dislocation in the boundary (dislocation part) as shown in FIG. 2. Therefore, the difference in the color depth in the gray pattern in the boundary is so small that we cannot visually recognize the dislocation easily. This makes it possible to invisibly embed a slanted rectangle in a base pattern as an additional information.

Figure 3:
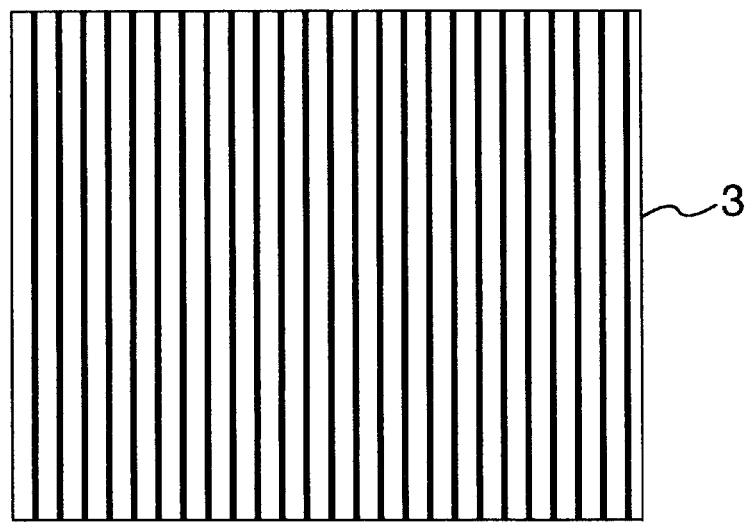
FIG. 3 is a diagram showing an example of a reference pattern according to the present invention.

FIG. 3 is a diagram showing a reference pattern used to visualize the additional information pattern 2 invisibly embedded in the base pattern 1. This reference pattern 3 is, for example, a striped pattern with black lines and pitches similar to those of the base pattern 1. This reference pattern is printed on a transparent medium such as a transparent film.

Figure 4:
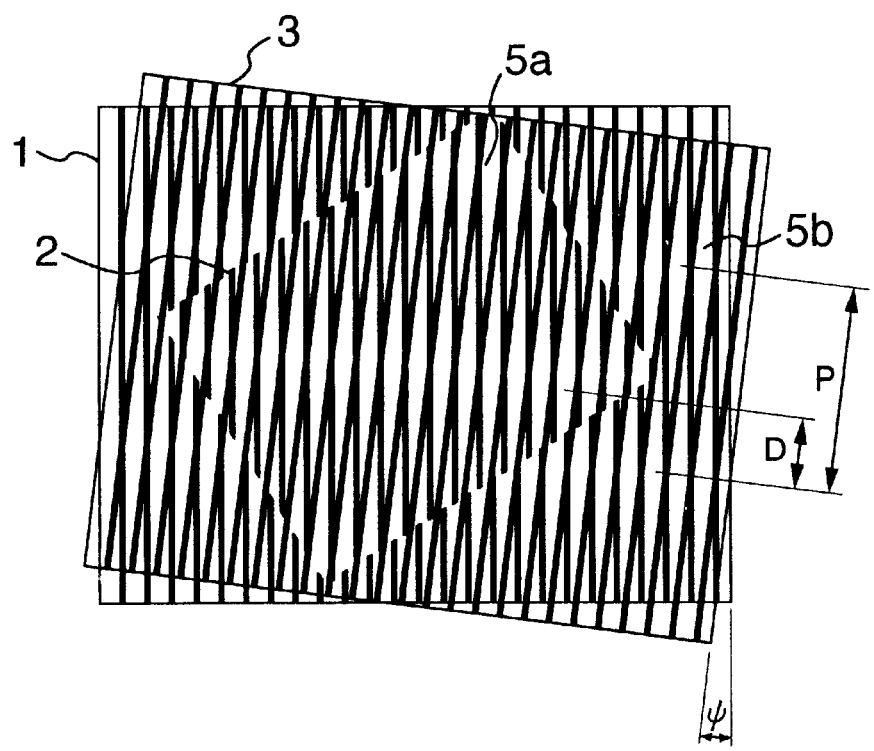
FIG. 4 is a diagram showing how an example of the printed matter including invisible information looks like when the reference pattern is put thereon.

FIG. 4 is a diagram showing the reference pattern 3, shown in FIG. 3, which is put obliquely on the base pattern 1 in which the additional information pattern 2, shown in FIG. 1, is invisibly embedded. When two patterns have a striped pattern at the same frequency, putting one on top of the other causes the stripe patterns to interfere each other, generating a moiré pattern at a wavelength longer than that of the base pattern and the reference pattern.

Next, the wavelength of the moiré pattern will be described. In the following description, it is assumed that the width of the black line and the pitch between each two lines of the reference pattern 3 are the same as those of the base pattern 1; that is, the width of the black line is 0.08 mm (corresponding to two lines) and the pitch between each two lines is 0.254 mm (corresponding to six lines). In the description below, this reference pattern 3, slanted at an angle of $\Psi$, is put on the base pattern in which the additional information pattern 2 is invisibly embedded, as shown in FIG. 1. Let P denote the moiré pitch in a base pattern part 5b. Then, $P=p/\sin \Psi$, where p is the pitch of the striped pattern shown in FIG. 2.

In FIG. 4, the moiré pitch P is illustrated as the interval between two crossings of the black line in the base pattern 1 and the black line in the reference pattern 3. In addition, because the striped pattern in the additional information pattern 2 is the same as the striped pattern in the base pattern 1, a moiré with the pitch P, which appears in the base pattern part 5b, appears also in an additional information pattern part 5a. However, as shown in FIGS. 1 and 2, there is the dislocation d in the striped pattern in the boundary between the base pattern 1 and the additional information pattern 2. Therefore, the moiré position in the additional information pattern part 5a differs from the moiré position in the base pattern part 5b by D shown in FIG. 4. This positional difference of D is represented as $D=d/\sin \Psi$.

If, as an example, p=0.254 mm, d=0.04 mm, and $\Psi=1°$, then the pitch P=14.5 mm and positional difference D=2.3 mm. Because of this large positional difference in the moiré generation position between the base pattern part 5b and the additional information pattern part 5a, putting the reference pattern 3 on the base pattern 1 allows the boundary of the additional information pattern 2, invisibly embedded in the base pattern 1, to be visually identified. Thus, the additional information pattern 2 may be visualized.

Next, let's take a look at a problem that will be presented when the boundary of the additional information pattern is parallel (that is, $\theta=0$) to the striped pattern of the base pattern 1.

Figure 5:
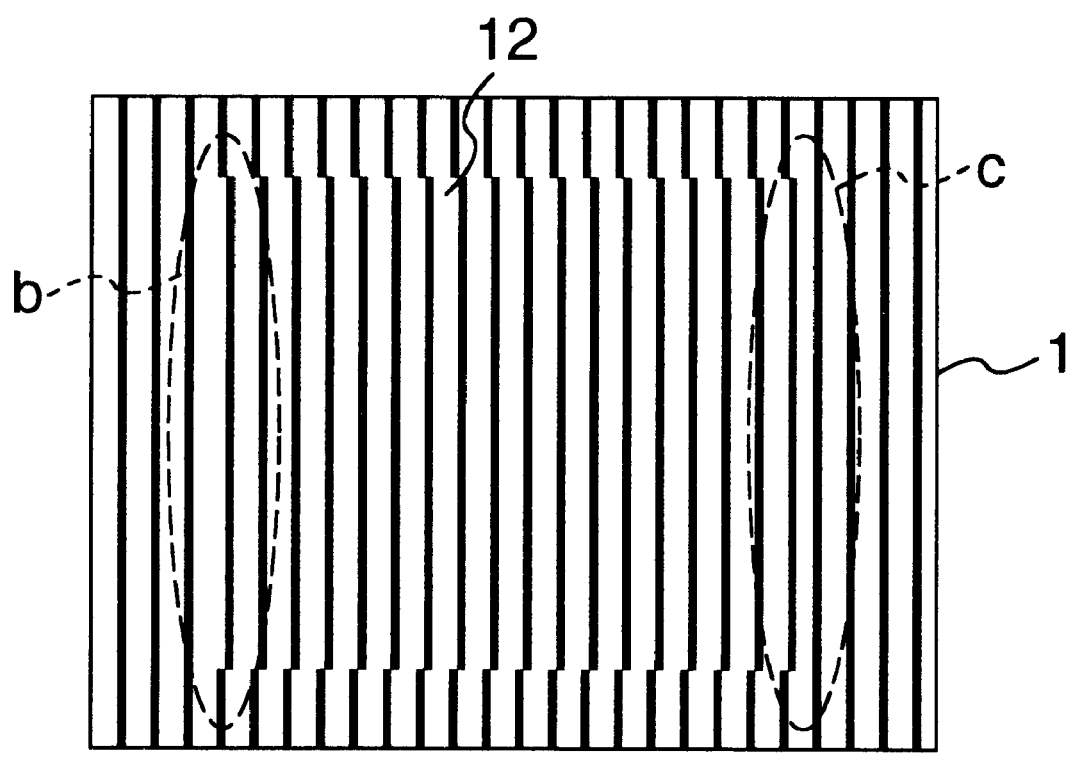
FIG. 5 is a diagram showing a case in which the boundary between a base pattern and additional information is parallel to the direction of stripes.

Referring to FIG. 5, the additional information pattern, though similar in shape to the rectangle in FIG. 1, is not slanted but is arranged with $\theta=0$. In this example, a striped additional information pattern 12 is shifted very slightly to the right with respect to the striped pattern in the base pattern 1.

In this arrangement, the right and left sides of the rectangle are parallel to the striped pattern in the base pattern. In this case, the width of the white part of the left side of the striped additional information pattern 12, shown as b in FIG. 5, is widened by a length the additional information pattern is shifted. This allows the white part to be visually identified as a thin white line.

On the other hand, the black line on the right side of the additional information pattern 12, shown as c in FIG. 5, is closer to the neighboring black line in the base pattern 1. This makes the black line visually identified as a thin black line. Thus, although the base pattern and the additional information pattern are each composed of a fine stripe pattern, the boundaries parallel to the stripe of the base pattern 1 or the additional information pattern 12 are visually identifiable as a part of the line at a different color density.

On the other hand, although, on the top and bottom sides of the striped additional information pattern 12, each of the thin lines is shifted 0.04 mm (or a dislocation) that is the minimum shift amount the above-described 600 dpi printer can process, a difference in color density cannot be identified. Therefore, the dislocation is visually unidentifiable on the top and bottom sides. That is, there is a relation between the angle θ of the boundary, which is between the additional information pattern and the base pattern, with respect to the striped pattern and the difficulty (invisibility) in identifying the boundary of the additional information pattern. The smaller the angle θ, the easier to visually identify the boundary; on the contrary, the larger the angle θ, the more difficult to visually identify the boundary and thus the higher the invisibility. When θ=90°, it is most difficult to visually identify the boundary and the invisibility becomes highest.

By way of an example, an experiment was carried out using the above-described 600 dpi digital printer with the vertical striped pattern being parallel to the print paper transportation direction. In the experiment, it is assumed that the width of the black line is 0.08 mm corresponding to two lines, that the pitch between two black lines is 0.254 mm corresponding to six lines, and that the dislocation in the striped pattern in the boundary between the base pattern and the additional information pattern is 0.04 mm that is the minimum width the 600 dpi digital printer can process. For a digital printer, the vertical striped pattern generated in the paper transportation direction is best because the resolution is highest and the pattern is printed most evenly.

The experiment shows that the boundary of the additional information pattern 2 visually identifiable for the angle θ<10° but virtually not for the angle θ>30°. The visual identification ability or the invisibility varies with the angle θ. In most cases, the visual identification ability is low for the angle θ>20° and, therefore, the additional information may be invisibly embedded in the base pattern. That is, as shown in FIG. 1, it is effective, in most cases, for the additional information pattern 2 to be slanted at least 20° so that the boundary between the additional information pattern 2 and base pattern 1 will not run parallel with the striped pattern.

Figure 6:
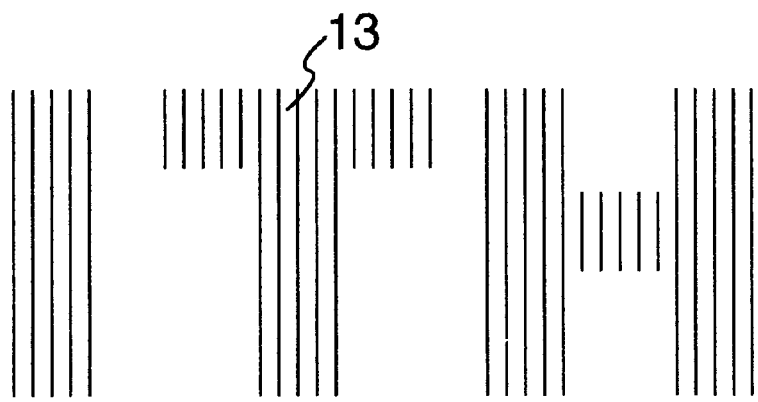
FIG. 6 is a diagram showing the additional information pattern of "ITH" characters.
Figure 7:
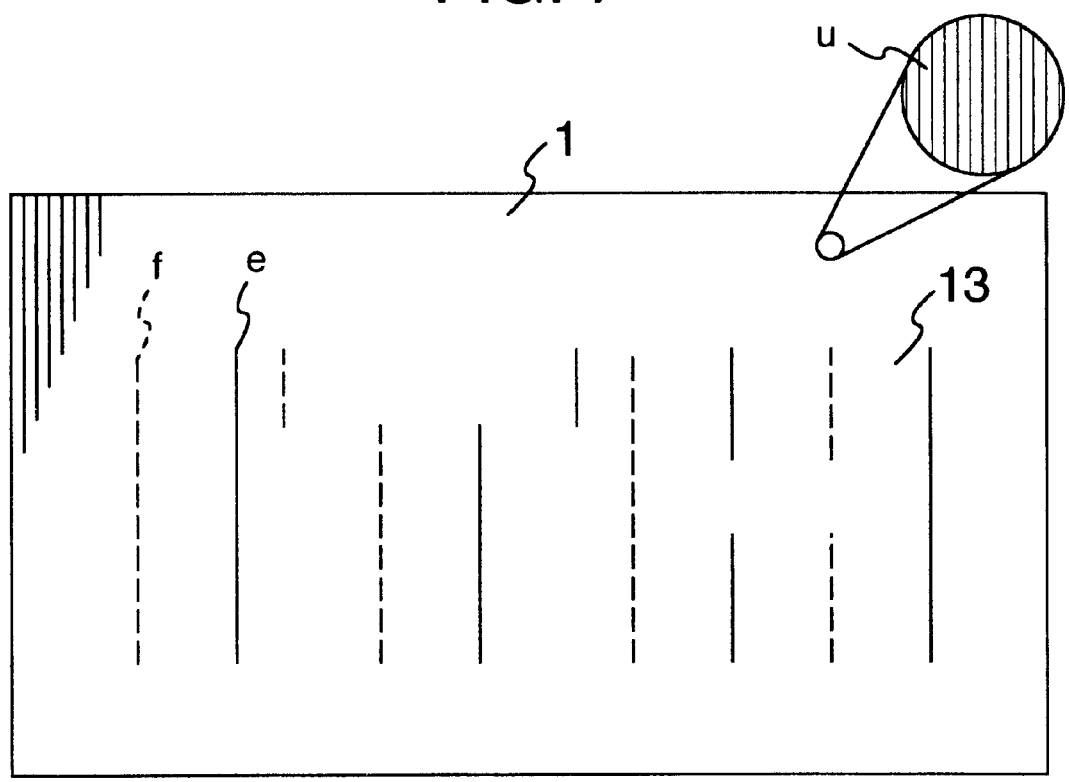
FIG. 7 is a diagram showing the status in which the additional information pattern of the "ITH" characters is embedded in the base pattern as upright Gothic characters.

In the following example that is more practical, characters are embedded as the additional information. FIG. 6 shows an example in which the alphabetic characters "ITH" 13 are represented as a striped pattern. The characters "ITH" are represented in upright gothic characters. FIG. 7 shows the characters "ITH" that are arranged in the base pattern 1 that is also a striped pattern.

Since both the base pattern 1 and the "ITH" character pattern are a vertical striped pattern such as the one shown in d, they are recognized as an evenly gray pattern as a whole. For illustration purposes, they are shown in the figure as white. As in FIG. 5, the striped pattern within the characters "ITH" in FIG. 7 are shifted right, for example, 0.04 mmm with respect to the vertical striped in the base pattern 1.

In FIG. 7, the solid line indicated by e, that is, the right-side boundary between the additional information "ITH" characters and the base pattern 1, is visually identified as a thin black line against the background that is gray as a whole, as with part c in FIG. 5. On the other hand, the broken line indicated by f in FIG. 7, that is, the left-side boundary between the additional information "ITH" characters and the base pattern 1, is visually identified as a thin white line against the background that is gray as a whole, as with part b in FIG. 5.

In FIG. 7, as with lines e and f, other black lines and white lines are indicated by solid lines and broken lines, respectively. The parts of the outline of the "ITH" characters that are parallel to the striped pattern indicated by u are identified as black lines and white lines. As a result, it is estimated that the characters "ITH" are present.

Figure 8:
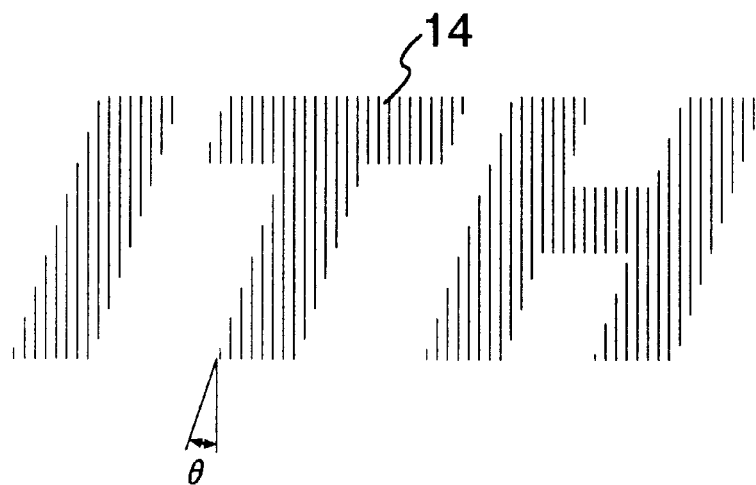
FIG. 8 is a diagram showing the additional information pattern of the "ITH" characters in slanted italic characters.
Figure 9:
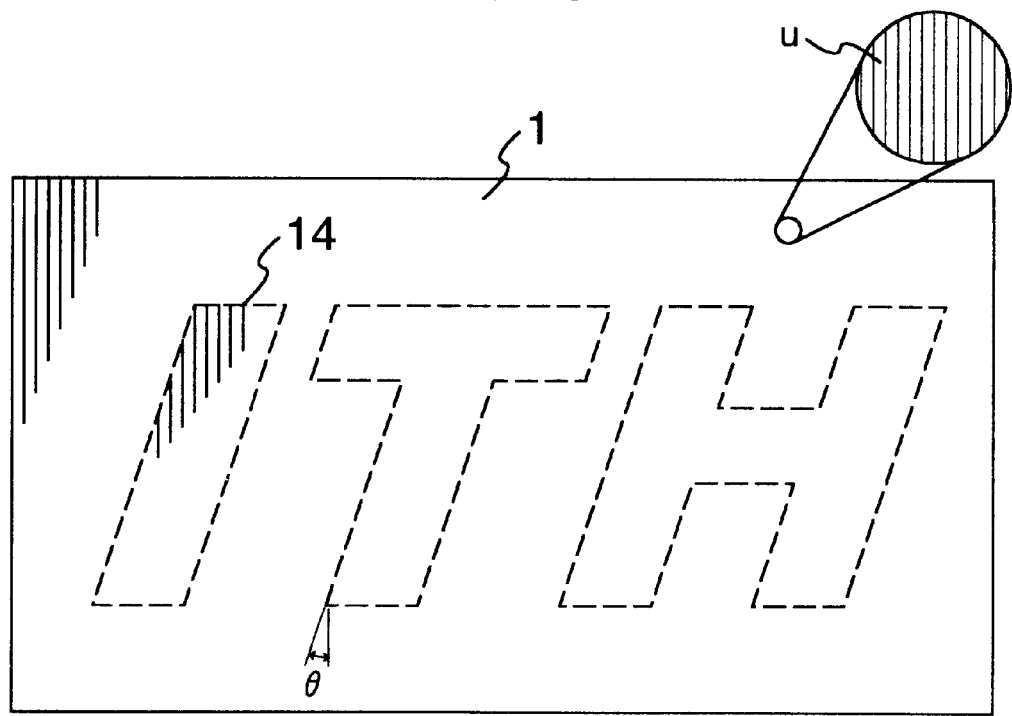
FIG. 9 is a diagram showing the status in which the additional information pattern of the "ITH" characters is embedded in the base pattern as slanted italic characters.

On the other hand, the characters "ITH" 14 are represented in italic and in a stripe pattern in FIG. 8. As described above, if the angle between the boundary line and the striped pattern is larger than 20°, that is, θ>20°, the boundary of the additional information is difficult to identify even if the characters "ITH" 14 are put on the base pattern 1. As a result, the characters "ITH" 14 may be invisibly embedded. In FIG. 9, the boundary is indicated by broken lines for purpose of illustration.

The above description disclosed a method for making the additional information difficult to visually identify by slanting the characters. Another method for giving the same effect is to rotate the additional information appropriate degrees. This minimizes parallel components and makes the additional information difficult to visually identify. This is accomplished, as shown in FIG. 1, by embedding the slanted rectangle into the base pattern as an additional information pattern.

To make the additional information invisible, a still another effective method is to deform a part of the style of characters or numbers to reduce the components parallel to the striped pattern. Referring to FIGS. 10–13, this method will be described by way of an example.

Figure 10:
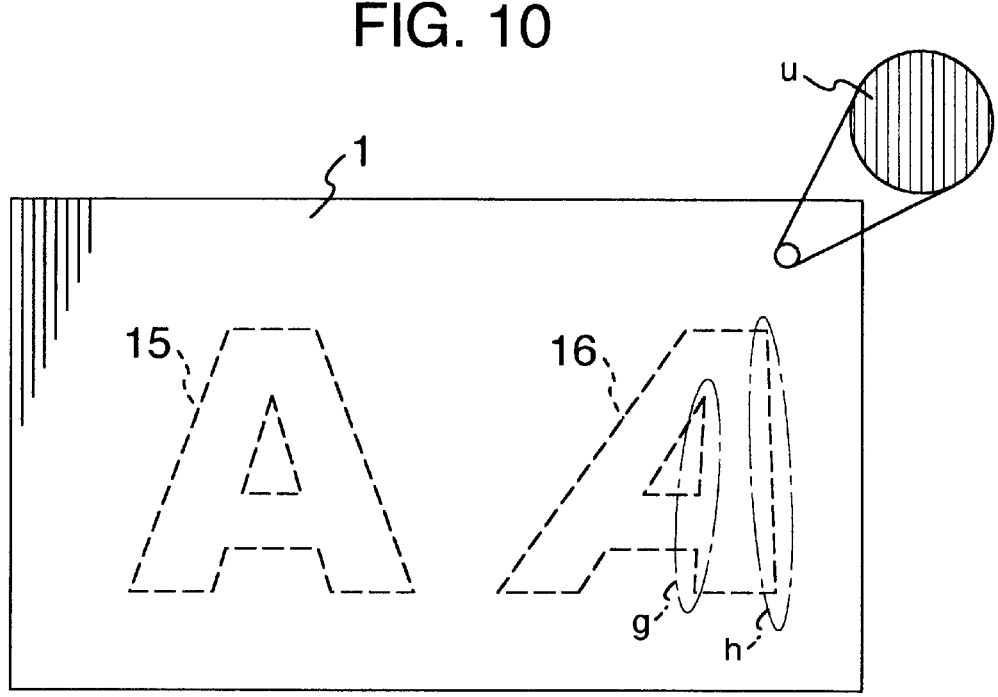
FIG. 10 is a diagram showing the status in which the additional information pattern of the "A" character is embedded in the base pattern.
Figure 11:
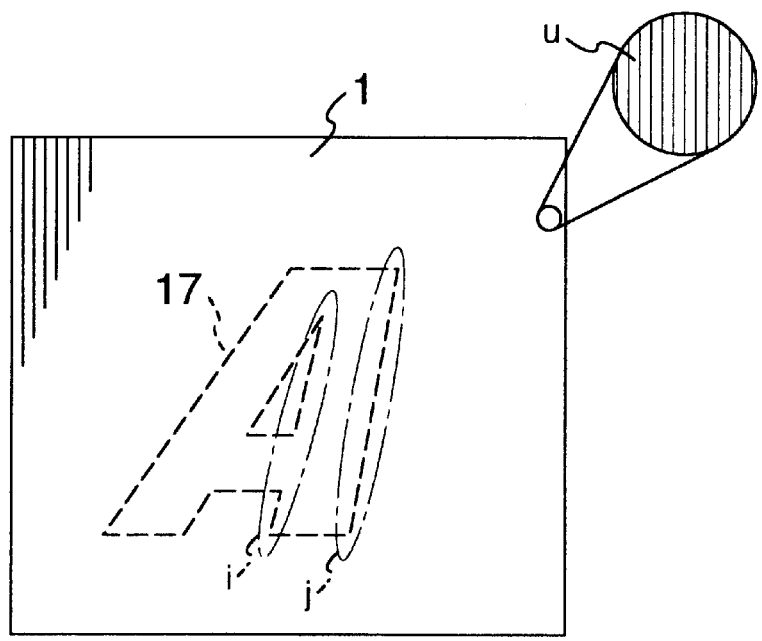
FIG. 11 is a diagram showing the status in which the deformed "A" character is embedded in the base pattern as the additional information pattern.

In FIG. 10, the alphabetic character "A" is represented as two separate character styles: an upright Gothic character 15 and a slanted italic character 16. In the upright Gothic character 15 of the "A" character, the boundary of the character is slanted against the vertical striped pattern of the base pattern 1. In the slanted italic character 16, the parts indicated by g and h are almost parallel to the vertical striped pattern of the base pattern 1. As a result, these parts are identified as black or white lines like those shown in FIGS. 5 and 7 and, therefore, the invisibility decreases. In such a case, it is a good idea to partially deform the character style. For example, as shown in FIG. 11, the character "A" is changed into a deformed character style 17. The parallel parts are slanted against the base pattern 1, as indicated by i and j, to make the parts difficult to visually identify and to increase invisibility. The deformed character style 17 may be created either by registering the deformed characters for use with the base pattern 1 or by finding the components of the characters parallel to the selected base pattern and then deforming those parts.

Figure 12:
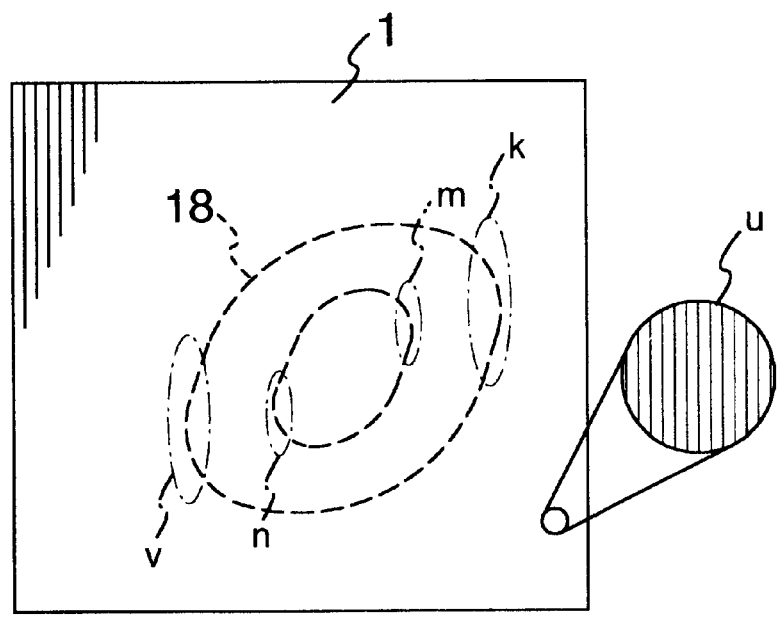
FIG. 12 is a diagram showing the status in which the additional information pattern of the "O" character is embedded in the base pattern.
Figure 13:
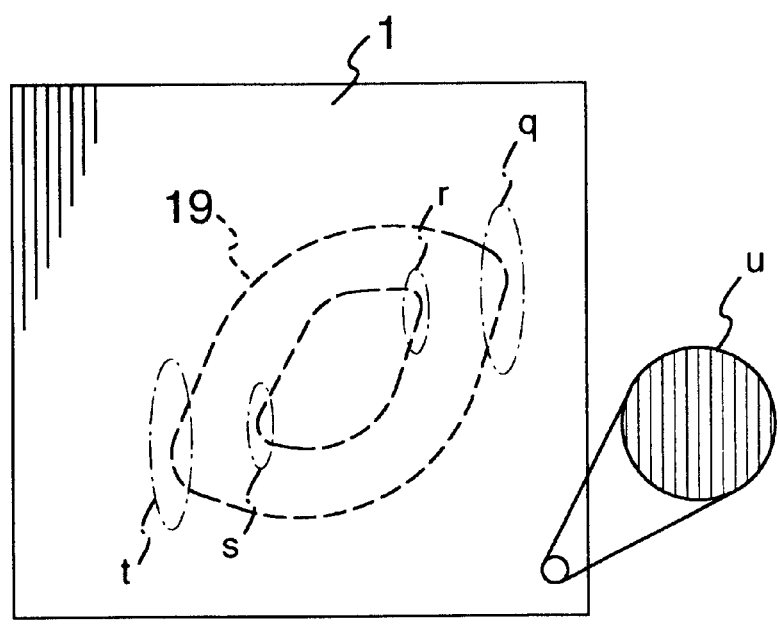
FIG. 13 is a diagram showing the status in which the deformed "O" character is embedded in the base pattern as the additional information pattern.

For additional information whose style always has an easily-identifiable part parallel to the striped pattern, it is effective to deform the style of the additional information so that the parallel part is shortened. For example, when additional information or a part thereof is a circle or an arc, a part of the circle or the arc always has a component parallel to the striped pattern of the base pattern. In such a case, the length of the parallel part may be reduced by reducing the radius of only the circle or the arc corresponding to the part and its neighboring parts parallel to the striped pattern. This deforms the style of the additional information and shortens the parallel part, thus making the additional information more invisible. FIG. 12 shows an example. In this example, an alphabetic character "O" 18 is embedded into the base pattern 1 as the additional information pattern. In FIG. 12, the "O" character is a slanted italic character. Parts k, m, n, and v, which are arcs, have parts parallel to the vertical striped pattern of the base pattern 1. A part with an angle of 10° or smaller with respect to the base pattern 1 may be visually identified as described above and, therefore, a part of the circular style is visually identified against the background that is gray as a whole. Although all the visible parts cannot be eliminated, it is effective to partially deform the "O" character 19 and to reduce the radius of the arcs, as shown in FIG. 13, so that the angle becomes 10° or smaller with respect to the vertical striped pattern of the base pattern 1, as indicated by parts q, r, s, and t.

A part of the arc is still visually identified even after the above process, but the visually identifiable part is reduced. Black lines and white lines appear only in a part of the ground pattern that is gray as a whole. In this case, unlike those shown in FIGS. 5 and 7, the shape of the additional information cannot be estimated from the scattered black lines and white lines. As a result, a high level of invisibility may be maintained.

Depending upon the shape of additional-information, another method is to select the direction of a striped pattern that is not parallel to the boundary between the additional information and the base pattern. For example, when the additional information is a rectangle such as the one shown in FIG. 5, the striped pattern may be slanted 30° or 45°.

Figure 14:
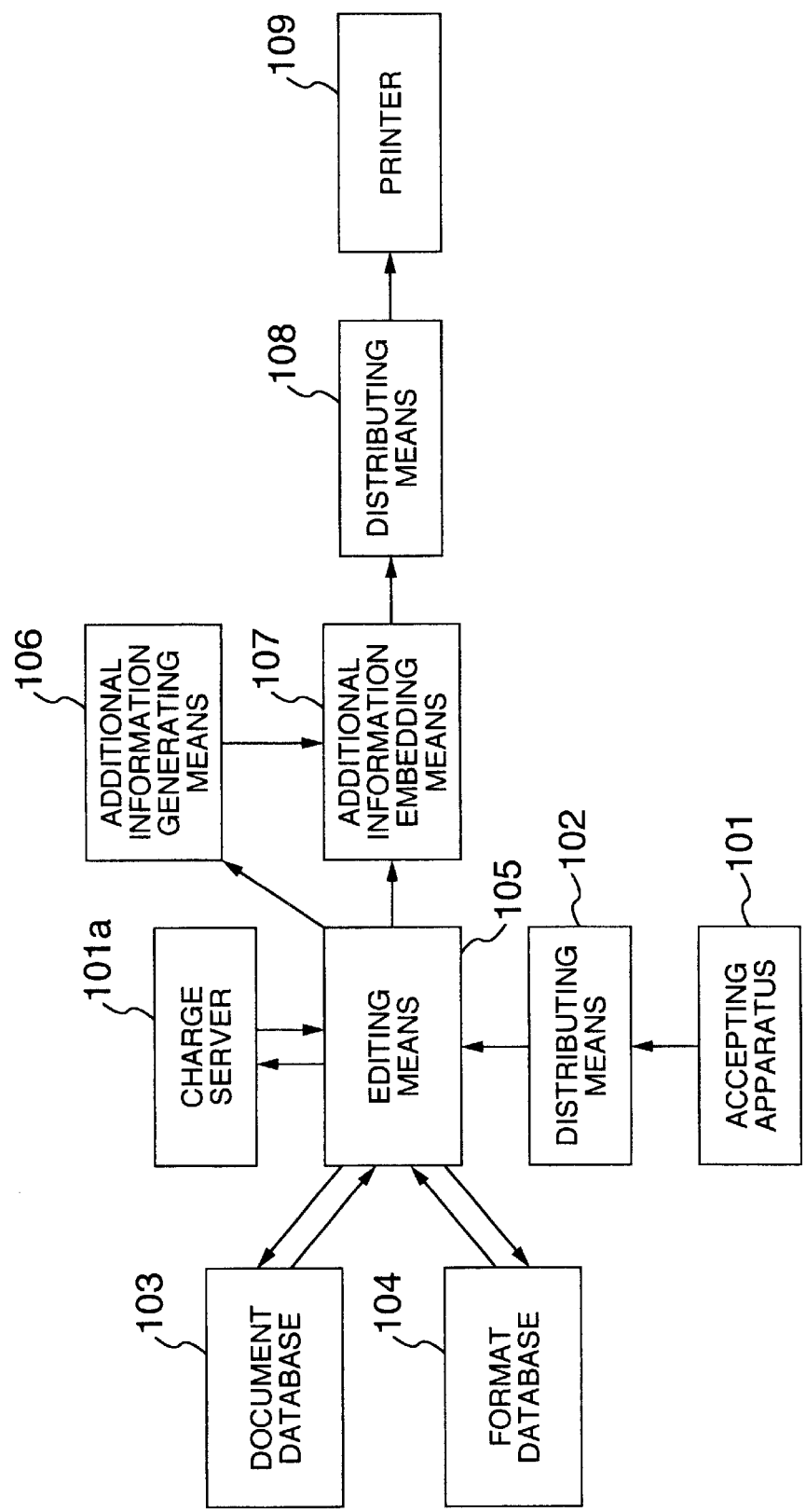
FIG. 14 is a block diagram showing the configuration of a print system according to the present invention.
Figure 15:
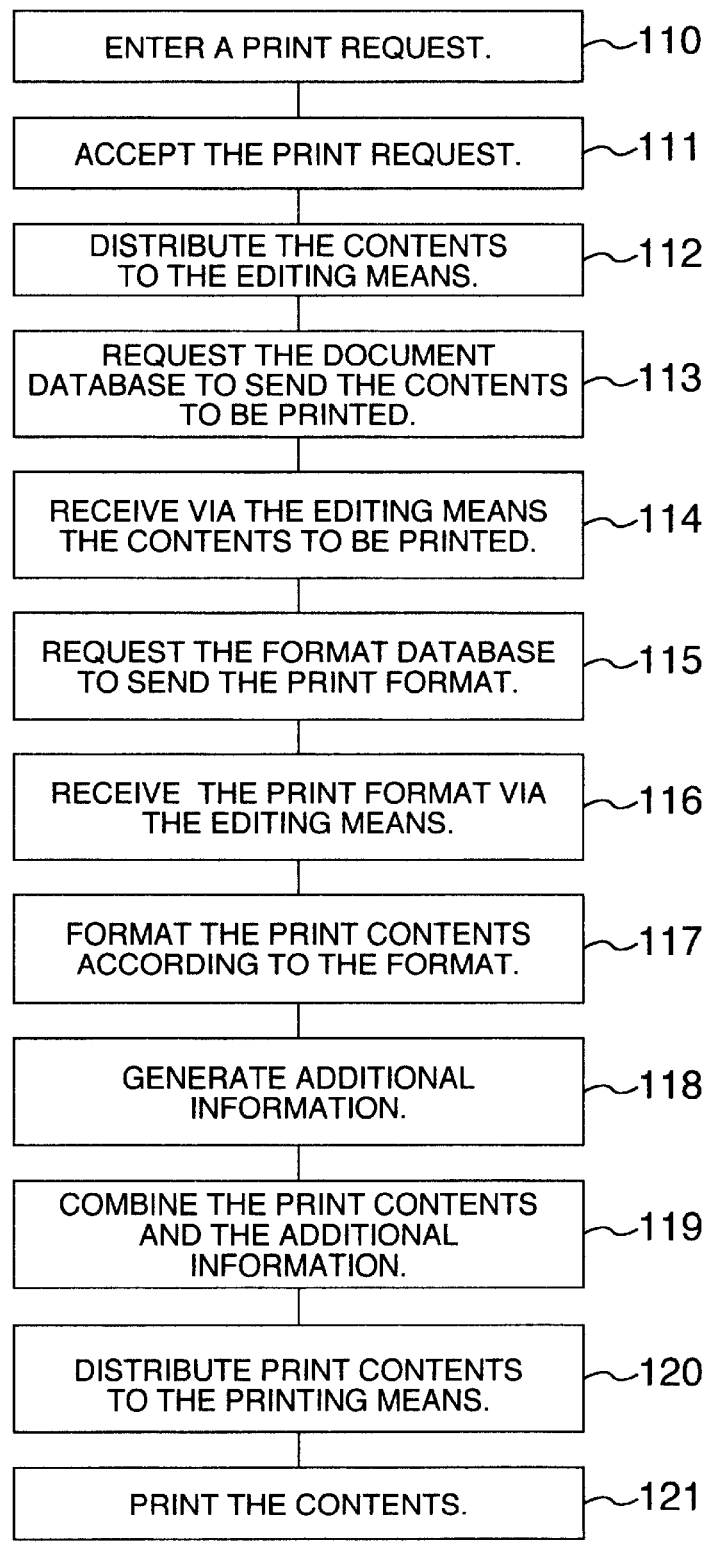
FIG. 15 is a flowchart showing the operation of the print system according to the present invention.
Figure 16:
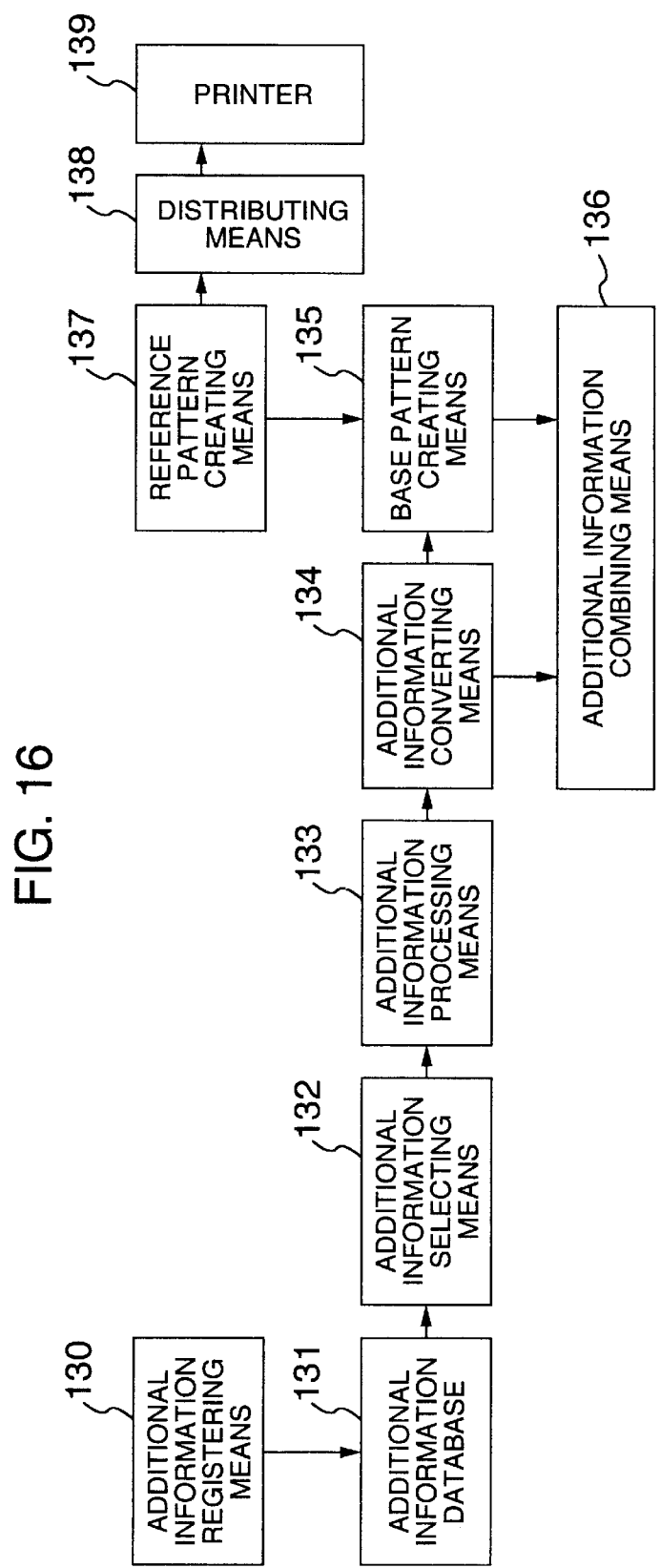
FIG. 16 is a block diagram showing the configuration of an additional information creation system according to the present invention.
Figure 17:
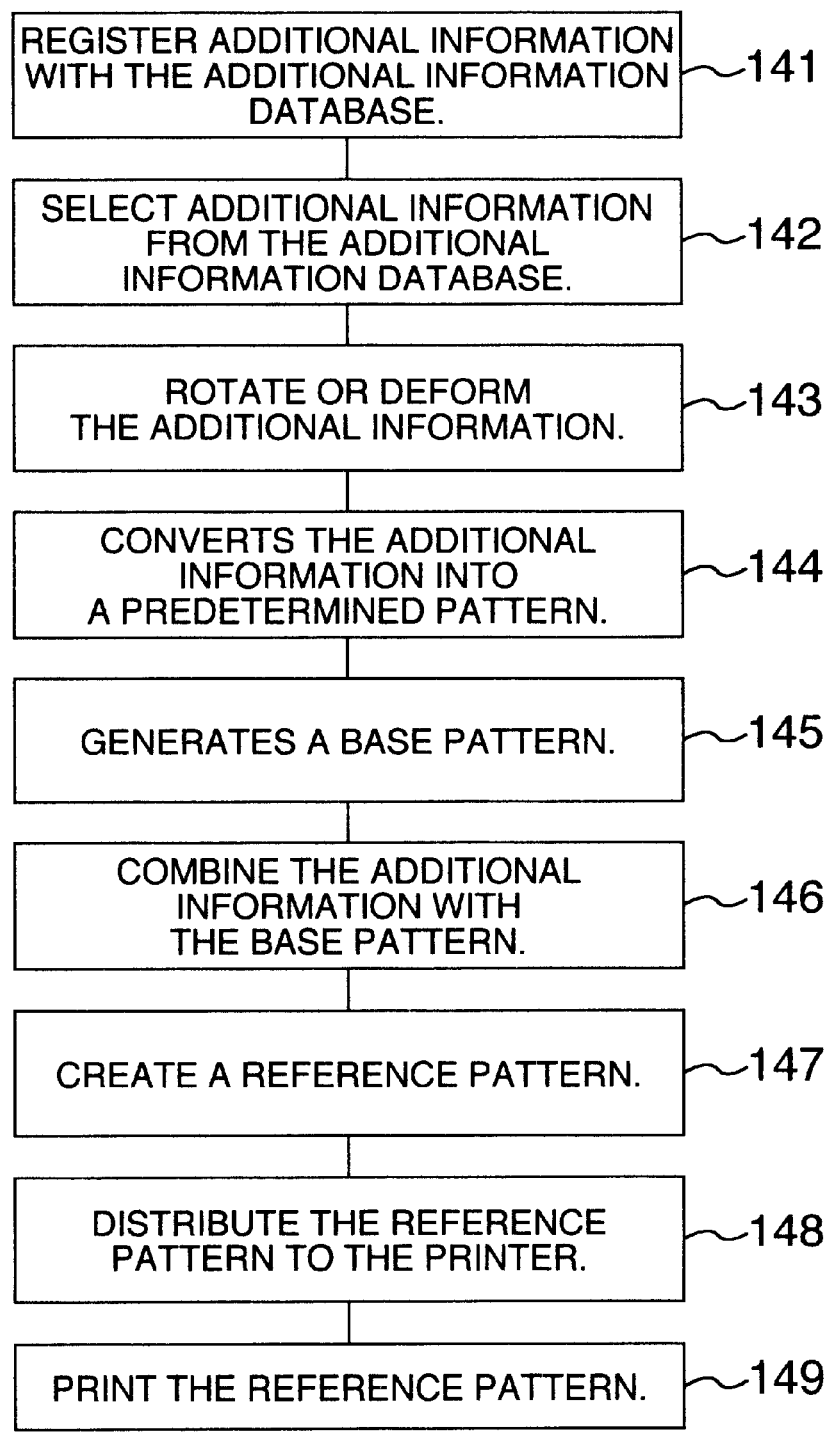
FIG. 17 is a flowchart showing the operation of the additional information creation system according to the present invention.

Next, a print system that prints a printed matter including invisible information, which was described above, will be described. FIG. 14 is a block diagram showing the configuration of the print system. FIG. 15 is a flowchart showing the operation of the print system shown in FIG. 14. FIG. 16 is a block diagram showing the configuration of an additional information generation means for generating additional information. FIG. 17 is a flowchart showing the operation of the additional information generation means.

Referring to the block diagrams and the flowcharts, a printed matter creation system according to present invention will be described.

In FIG. 14, an accepting apparatus 101 accepts a printed matter request from a requester and, at the same time, receives required information such as requester's name. The accepting apparatus 101, corresponding to a terminal in a network system, may be a computer. Distributing means 102 sends information, accepted from the requester via the accepting apparatus 101, to editing means 105.

A document database 103 registers and stores therein contents information on various documents and, upon receiving an instruction, returns the requested data. For example, the database may contain information on the names and addresses of residents under the jurisdiction or information on an event such as the date, place, admission fees, and reservation status of the event. A format database 104 registers and stores therein format information on various documents and, upon receiving an instruction, returns the specified data. For example, this format information may be information on ruled lines, character sizes, array sizes, line spacing, character spacing, and fonts.

The editing means 105 issues an instruction to the document database 103 to get required document information from the document database 103. Also, the editing means 105 issues an instruction to the format database 104 to get required format information from the format database 104. In addition, the editing means 105 arranges or formats (for example, enclose information by ruled lines) document information retrieved from the document database 103 according to format information retrieved from the format database 104.

Additional information creating means 106 is means for creating information, such as character information or mark information, to be added to the printed matter as invisible information. Additional information embedding means 107 embeds as invisible embedded information the additional information, created by the additional information creating means 106, into the document information formatted by the editing means 105 according to the predetermined format.

Distributing means 108 distributes the document information into which the invisible embedded information has been embedded by the additional information embedding means 107. A printer 109 prints the information, distributed by the distributing means 108, on a non-electronic medium such as a paper.

For faster processing, the editing means 105 and the additional information embedding means 107, which perform processing from the time acceptance information is received from the distributing means 102 to the time printed information is distributed to the distributing means 108, are preferably composed of one processor. In this case, a processing program which performs the processing of the editing means 105 and a processing program which performs the processing the additional information embedding means 107 may be executed on a computer to implement the embodiment.

Next, referring to the flowchart shown in FIG. 15, the operation steps of the printed matter creation system according to the present invention will be described. First, a requester requesting the issuance of a printed matter enters the type and contents of a desired printed matter from the accepting apparatus 101 (step 110). This is, for example, a request for certificates such as a resident's card identifying the current address of the requester or a request for the admission ticket of an event. In addition, the requester may enter, as necessary, personal information such as the name of the requester or the contents of the document to be printed. When the requester has entered such information, the acceptance of a print request is completed (step 111).

When information on the type and the contents of the desired printed matter has been entered, the information is distributed to the editing means 105 via the distributing means 102 (step 112).

The distributing means 102 may be, for example, a network such as the Internet. In such a case, the accepting apparatus 101 and the editing means 105 may be located remotely. The distributing means 102 may be a unit connecting the accepting apparatus 101 and the editing means 105 both of which are in the same building via a LAN (Local Area Network). Furthermore, the accepting apparatus 101 and the editing means 105 may be the same unit. In such a case, the distributing means 102 may be eliminated.

The editing means 105 requests the document database 103 to send the document contents, such as text data, corresponding to the request entered from the accepting apparatus 101 (step 113). Upon receiving the request, the document database 103 sends the requested document contents to the editing means 105. The editing means 105 receives that information (step 114). Following this step, the editing means 105 requests the format database 104 to send the print document format of the document to be printed, for example, information on the character layout or ruled lines (step 115). Upon receiving the request, the format database 104 sends the requested information to the editing means 105. The editing means 105 receives that information (step 116). Then, the editing means 105 formats the document contents for editing based on the received format information (step 117).

For example, the names and the addresses of residents are stored in the document database 103 as text data. The fixed format information on forms to be printed, such as format data on a resident's card, is stored in the format database 104. The editing means 105 combines these two types of data to edit resident's cards according to the predetermined format. Storing format information and document contents in separate databases in this way allows only one format to be stored for each format type, thus reducing the amount of information. In addition, the document information may be composed only of text data with only attribute information added if any. This also reduces the amount of information.

In the above example, document information and format information are stored in separate databases. When one of the two databases is large enough, the document information and the format information, both of which constitute document data created by a word processor and so on, may be integrated into one. In such a case, the document database 103 and the format database 104 may share the same database.

Next, the additional information creating means 106 generates additional information to be added to the printed matter as invisible information (step 118). This additional information may be the shape of a special character, the shape of a symbol, or a number representing the date on which the document is printed. Or, it may be information specific to a matter to be printed, for example, a unique number generated as a random number.

Next, the printed contents and the additional information are combined (step 119). In this step, the additional information is combined into the print contents as invisible information.

Here, the contents of additional information and an embodiment of charging method for printing the additional information will be described. For printed matters issued by a local government such as various copies and marriage certificates, a charge server 101*a* connected to the editing means 105 calculates the fee according to the type of a printed matter when a requester makes a print request via the accepting apparatus 101. The charge server then displays the fee information on the accepting apparatus 101 to request the requester to pay the fee. When a system operation organization other than a local government runs the system for creating a printed matter in which invisible information is embedded, the charge server 101*a* charges the requester for the fee and, at the same time, calculates the usage fee and charges the local government using that system for the calculated usage fee. In this case, users such as the local government must pay the system operation organization either for the amount of system usage, for example, for each predetermined quantity of printed matters, or for a predetermined ratio of the fee. A fee on a pay-per-use basis may be added according to the amount of generated information.

Then, the distributing means 108 distributes to the printer 109 the print contents including additional information as invisible information. The distributing means 108 may be a network such as the Internet. In such a case, the editing means 105 and the printer 109 may be located remotely. Or, the distributing means 108 may be a unit connecting the editing means 105 and the printer 109 both of which are in the same building via a LAN (Local Area Network).

If the accepting apparatus 101 and the printer 109 are installed in the same place and the editing means 105 is located remotely, the requester of a printed matter may issue a request for the printed matter to the remotely located editing means 105 and receive the printed matter where the request was issued. For example, assume that the accepting apparatus 101 and the printer 109 are installed in a convenience store or a post office and that the editing means 105, document database 103, format database 104, and additional information creating means 106 are installed in an office of a local government such as a city office or a ward office or in the office of a promoter of an event. In this case, the requester may issue a request for a printed matter from the convenience store or the post office and get the printed matter there. In addition, because the printer matter includes invisible information as additional information, the means for visualizing the invisible information allows the requester to make sure that valid additional information is printed.

In this case, a digital printer is preferably used as the printer 109, because a striped pattern parallel to the print form transportation direction ensures the most even pattern.

Next, the additional information creating means as well as a system for creating reference information for visualizing the additional information will be described with reference to FIGS. 16 and 17.

FIG. 16 is a diagram showing the outline of a system for creating two types of information: additional information and reference information for visualizing the additional information. In FIG. 16, additional information registering means 130 registers with an additional information database 131 the information to be used as additional information. Examples of the additional information include characters such as numbers and alphabetic characters, marks, print of seals, and personal names. In response to an application or a request received via the accepting apparatus 101 shown in FIG. 14, additional information selecting means 132 selects predetermined additional information from the additional information stored in the additional information database 131. Additional information processing means 133 rotates, slants, or partially deforms the shape of the selected additional information so that the components parallel to the vertical striped pattern of the base pattern are minimized. More specifically, the additional information processing means performs the processes described in FIGS. 1–13. These processes may be performed individually or in combination. Additional information converting means 134 converts the selected additional information to a striped pattern to make the information invisible.

Base pattern creating means 135 creates a base pattern into which additional information is to be embedded as invisible information. Additional information combining means 136 arranges and invisibly embeds the additional information pattern in the base pattern so that the stripes of the two patterns have a predetermined dislocation in the boundary. Reference pattern creating means 137 creates a reference pattern used to visualize additional information invisibly embedded in the base pattern. Distributing means 138 distributes the reference pattern created by the reference pattern creating means 137. A printer 139 prints the distributed reference pattern. The distributing means 138 may be, for example, a network such as the Internet. In such a case, the reference pattern creating means. 137 and the printer 139 may be located remotely. Or, the distributing means 138 may be a unit connecting the reference pattern creating means 137 and the printer 139, both of which are in the same building via a LAN (Local Area Network).

FIG. 17 is a flowchart showing the operation steps of the system for creating additional information as well as reference information used to visualize the additional information. First, the additional information registering means 130 registers additional information with the additional information database 131 (step 141). For a local government that issues printed matters, the registered additional information may be the mark of the local government. For the promoter of an event, the registered additional information may be the mark of the promoter, the number representing the date, or the character information, such as kanji (a Chinese character), kana (a Japanese syllabary), or alphabetic characters. Next, from the additional information registered in the additional information database 131, the additional information selecting means 132 selects additional information to be printed (step 142). Then, as described in FIGS. 1–13, the additional information processing means 133 rotates, slants, or partially deforms the additional information so that the components of the additional information that are parallel to the striped pattern of the base pattern are minimized (step 143).

Next, the additional information converting means 134 converts the selected additional information to a predetermined pattern to make it invisible (step 144). The base pattern creating means 135 creates a base pattern (step 145). The additional information combining means 136 combines the base pattern with the additional information pattern so that there is a dislocation in the boundary between the two striped patterns (step 146). In this way, the additional information is invisibly embedded into the base pattern.

On the other hand, the reference pattern creating means 137 creates a reference pattern used to visualize the additional information embedded invisibly in the base pattern (step 147). The distributing means 138 distributes the reference pattern to the printer 139 (step 148) and then prints it on a transparent medium (step 149). Distributing a reference pattern and then printing it in this way allows the reference pattern to be printed remotely from the editing means. The reference pattern may be printed at the same time the printed matter including a pattern in which invisible information is embedded is printed. The record of the correspondence between printed matters and reference patterns may be kept to allow a reference pattern to be printed whenever and wherever it is needed.

With an invisible-information-embedded pattern printed on a non-electronic medium such as a paper, putting the reference pattern on that non-electronic medium enables the user to determine whether the invisible information is embedded in the printed pattern. In addition, the outline shape of the invisible information may be visually identified.

The contents of additional information and another example of the method for charging the user for printing additional information will be described. In the example described below, new additional information not yet registered, such as personal messages "HAPPY BIRTHDAY" or user's name, is created. In this case, the requester enters desired characters into the additional information registering means 130 directly from the accepting apparatus 101 or via an input device, and then the editing means 105 registers those characters with the additional information registering means 130. The characters may be entered not only from a keyboard or through the character recognition function but also electronically from other input devices such as a scanner reading image information prepared by the requester or an electronic image reader reading electronic images from an electronic medium. For the accepting apparatus 101 with no such input device installed, the operator may enter characters directly into the additional information registering means 130. In addition, the editing means 105 may control the additional information creating means 106 to allow the requester to select data to be made invisible directly with the additional information selecting means 132 instead of registering it with the additional information database 131. In this case, because the data requested by the requester to be kept invisible is not registered with the additional information database 131, the requester's privacy is protected. Following the processing described above, the additional information converting means 134 may convert the data, requested by the requester to be kept invisible, to invisible information with the characters or image information as the additional information.

When the requester requests, via the accepting apparatus 101, to print a printed matter including invisible information or to create new additional information, the charge server 101a connected to the editing means 105 calculates the cost for creating new additional information and the fee predetermined according to the printed matter, displays the charge information on the accepting apparatus 101, and requests the requester to pay the fee. When a system operation organization other than a business enterprise where the accepting apparatus 101 or printer 109 or 139 is installed runs the system for creating a printed matter including invisible information, the charge server 101a charges the requester for the fee and, at the same time, calculates the usage fee and charges the business enterprise using that system for the calculated usage fee. In this case, the business enterprise must pay the system operation organization either for the amount of system usage, for example, for each predetermined quantity of printed matters, or for a predetermined ratio of the fee. As in the charge system described before, a fee on a pay-per-use basis may be added according to the amount of generated additional information. In addition, when additional information to be printed as invisible information is already registered, charging a fee smaller than that for new additional information increases convenience and allows the requester to use the same printed matter repeatedly, providing better service.

Figure 18:
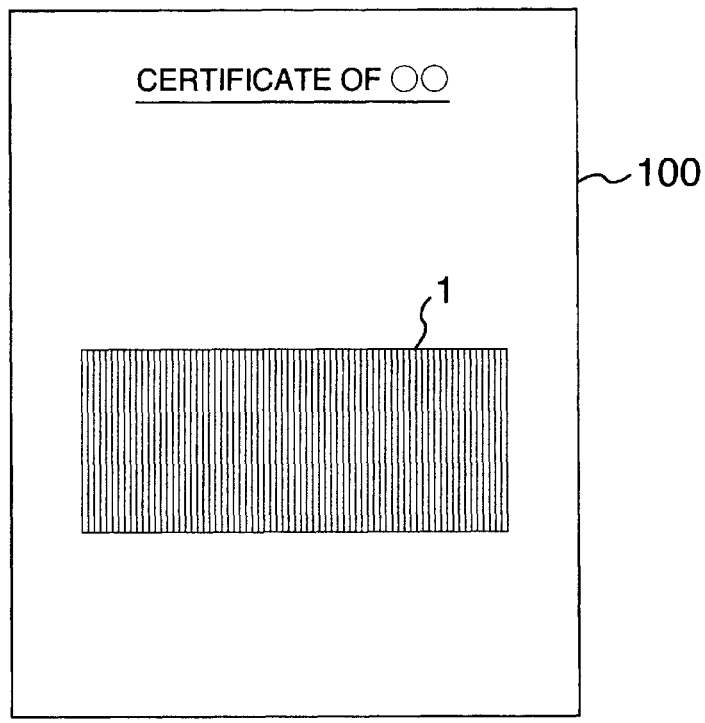
FIG. 18 is a diagram showing one embodiment of a printed matter to which additional information according to the present invention is added.
Figure 19:
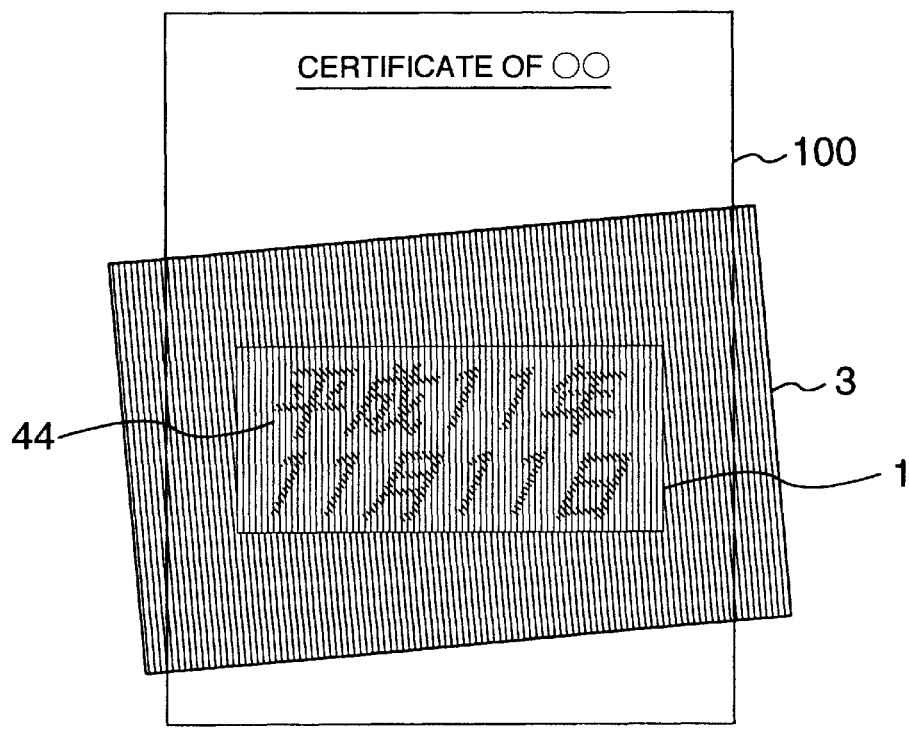
FIG. 19 is a diagram showing the additional information visualized by putting the reference pattern on one embodiment of the printed matter to which additional information according to the present invention is added.

An example of a printed matter created as described above will be described with reference to FIGS. 18–21. In FIGS. 18–19, number 100 is a printed matter, such as a certificate, printed with the printer 139. The printed matter has a part for the base pattern 1 in which additional information is invisibly embedded. This base pattern 1 is identified as an almost even gray print area. FIG. 19 is a diagram showing how the base pattern 1 looks like when the reference pattern 3 is put thereon. The base pattern 1 and an additional information pattern area 44 generate a unique moiré. In this embodiment, the issue date "平成１１年１１月１１日" (Japanese calendar date of Nov. 11, 1999) may be visually identified. In this embodiment, the base pattern 1 and the additional information pattern area 44 are a vertical striped pattern. To reduce the part parallel to the vertical striped pattern, the characters "平成１１年１１月１１日" are slanted.

In this embodiment, the relative position and the angle of the reference pattern need not strictly match those of the base pattern. Even if the positions are not aligned precisely, the pitch of the moire pattern generated when the reference pattern is put on the base pattern or the additional information pattern is the same. In addition, even if the angle of the reference pattern do not match the angle of the base pattern or additional information pattern, only the pitch of the generated moiré varies. The advantage is that this embodiment does not require precise alignment. That is, simply putting the reference pattern on the base pattern allows the user to visually identify the additional information pattern embedded as the invisible information. The ability to visualize invisible information allows invisible information to be added to a variety of printed matters.

Figure 20:
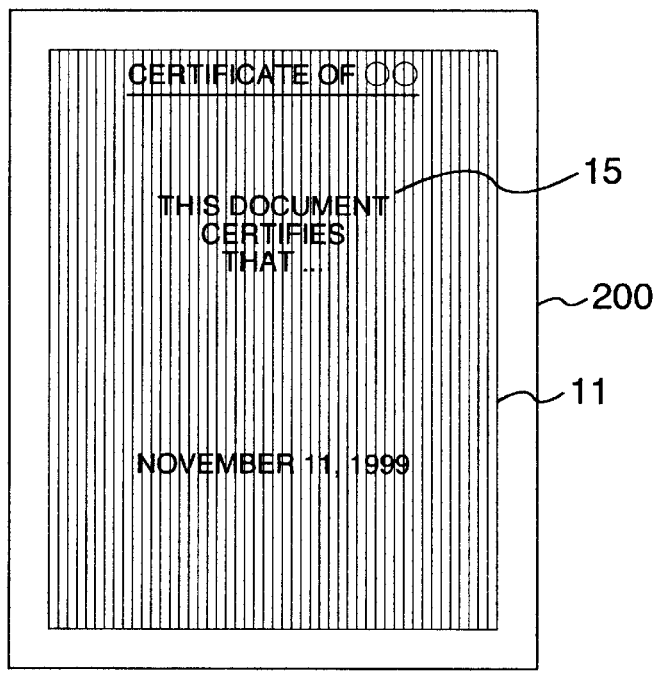
FIG. 20 is a diagram showing another embodiment of a printed matter to which additional information according to the present invention is added.

In another embodiment, additional information is invisibly embedded almost across a printed matter as a ground pattern 11. Main information such as characters or graphics with a density different from that of the ground pattern 11 (for example, black or white) may be printed in the ground pattern 11 which is gray as a whole. When white is used, the characters or graphics that are main information is printed in white in the ground pattern 11. One embodiment is shown in FIG. 20. In this embodiment, the characters are displayed in black.

FIG. 20 shows one embodiment of a printed matter 200 including the ground pattern 11, in which invisible additional information pattern is embedded, and visible main information 15. Because the printed matter 200 has the main information 15 which may be visually identified as characters or graphics, a person viewing the printed matter 200 pays attention to the main information 15 or concentrates on understanding its contents. This makes it even more difficult to visually identify the additional information pattern even if it is invisibly embedded in the ground pattern 11.

Figure 21:
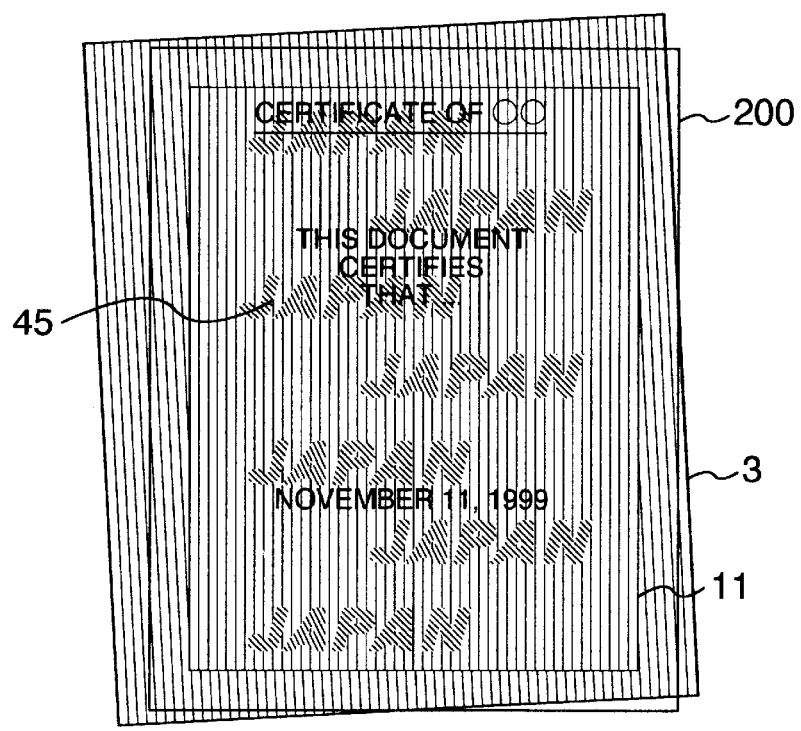
FIG. 21 is a diagram showing the additional information visualized by putting the reference pattern on another embodiment of the printed matter to which additional information according to the present invention is added.

FIG. 21 is a diagram showing how the printed matter 200 including invisible information shown in FIG. 20 looks like when a reference pattern is put thereon as in FIG. 21. Putting the reference pattern on the base pattern as in FIG. 21 visualizes the additional information pattern invisibly embedded in the ground pattern 11, in this case, characters "JAPAN". The characters "JAPAN" 45, which is a additional information pattern, may overlap with the main information 15.

Another embodiment of the present invention is a system issuing printed matters such as greeting cards Christmas cards. As visible information, the characters such as "THANK YOU" or "MERRY CHRISTMAS" are printed on a card; invisible information, such as a recipient's portrait or some other characters or a mark, is embedded in the background. The card, as well as the reference pattern printed on a transparent sheet for visualizing the invisible information, is put in an envelope and mailed. The greeting card issuing system in this embodiment continuously prints, with the printer 109 shown in FIG. 14, the card in which invisible information is embedded and the reference pattern used to visualize the invisible information. When the reference pattern and the card whose ground includes the printed invisible information are put in an envelope with the reference pattern on the card, the recipient will identify the invisible information immediately when he or she opens the envelope. However, when the transparent sheet on which the reference pattern is printed is put on the side of the card opposite to the ground in which the invisible information is printed, the recipient can view only the visible information. The recipient then puts the enclosed reference pattern on the ground, visually identifies the invisible information embedded in the ground for the first time, and finds another message or a portrait embedded in the ground. Therefore, the card gives the recipient a vivid impression.

To prompt the recipient to put the reference pattern on the ground, a note stating that the transparent sheet be put on the card should be written on the card or the transparent sheet or on both.

In the above embodiments, the base pattern and the reference pattern have a black and white stripe pattern. The color is not limited to black and white; a plurality of other colors may be used. For example, in the printed matter shown in FIG. 20, the ground pattern 11 may be printed in cyan with the visible main information 15 in black.

In the embodiments, a 600 dpi digital printer is used. A digital printer with a higher resolution may also be used. In such a case, the dislocation d in the striped pattern shown in FIG. 2 becomes even smaller, thus increasing invisibility and making it even more difficult to identify the dislocation.

In the embodiments, a printed matter printed with a digital printer is described. The printer is not limited to a digital printer. The embodiments may also be applied to a printed matter printed by other pincers such as an offset printer.

In the embodiments, the boundary between the base pattern and the additional information pattern is slanted against the striped pattern at least 20 degrees($\theta>20°$) to make the boundary difficult to visually identify so that the additional information pattern may be invisibly embedded in the base pattern. For a printer with a different resolution, the degree need not always be $\theta>20°$.

The contents of additional information used in a system according to the present invention may be image information such as the emblem or the printed seal of a company or a local government that issues printed matters. Furthermore, invisible information may be printed on advertising leaflets or direct mail distributed by stores in the distribution industry such as supermarkets or department stores. The invisible information may be visualized by putting the reference pattern a leaflet or direct mail. In this embodiment, the reference pattern is first distributed to the distributor stores and then printed on a transparent film with a printer. Invisible additional information printed on a leaflet or direct mail may be prize, lottery or coupon win/loss information. The recipient of the leaflet or direct mail takes the leaflet or direct mail to a store to have it checked with the reference pattern. The win/loss status may be checked with the visualized information.

Moreover, a print request or an application may be issued to the editing means installed in another location and, in addition, the reference information may be printed on a transparent film with a printer installed in another location. This makes it possible to take a printed matter to a place where the printed reference pattern is available to visualize the printed additional information. For example, a print request is entered from an information entry terminal installed in a convenience store or some other place to get a printed matter including invisible additional information such as the admission ticket of an event. At the same time, the corresponding reference pattern may be distributed to the event place. In such a case, putting the reference pattern on the admission ticket at the event place makes it possible to check if the predetermined additional information will appear and thereby to check if the additional information printed on the admission ticket is valid.

For a printed matter used in this embodiment, the reference pattern need not be aligned precisely on the base pattern. Thus, another advantage of the present invention is that simply putting the reference pattern on the base pattern allows the invisibly embedded additional information to be visualized.

In the system according to the present invention described above, additional information may be invisibly printed on a printed matter with a digital printer. In addition, the additional information may visualized and read by physically putting the reference pattern on the printed matter.

What is claimed is:

1. A printed matter including invisible information comprising:
   a base pattern formed of a striped pattern having stripes at a predetermined interval; and
   an additional information pattern having information to be added to said base pattern wherein said additional information pattern being a striped pattern having stripes of substantially a same width and predetermined interval as said base pattern and having a direction substantially parallel to a direction of said stripes of said base pattern, wherein a boundary between said base pattern and said additional information pattern has a predetermined dislocation between the striped pattern of said base pattern and the striped pattern of said additional information pattern, and wherein the boundary is at an angle equal to or larger than a predetermined angle.

2. The printed matter according to claim 1 wherein said base pattern and said additional information pattern are printed with at least a digital printer.

3. The printed matter according to claim 2 wherein an amount of the dislocation in the boundary between said base pattern and said additional information pattern is a minimum unit of resolution of said digital printer.

4. The printed matter according to claim 1 wherein visually identifiable information is printed with said base pattern in which said additional information pattern is embedded.

5. The printed matter according to claim 4 wherein an area in which the visually identifiable information is printed and an area in which the base pattern invisibly embedding therein the additional information pattern is printed are provided separately.

6. The printed matter according to claim 4 wherein the base pattern invisibly embedding therein the additional information pattern is provided as a ground pattern and wherein the visually identifiable information in a density different from the density of the base pattern is printed over the ground pattern in the base pattern.

7. The printed matter according to claim 1 wherein said additional information pattern is visualized by a discontinuation of a moiré pattern in the dislocation of the stripe pattern, said moiré being generated by putting a reference pattern on said additional information pattern, said reference pattern being printed on a transparent medium and being formed by the pattern of stripes at the predetermined interval.

8. The printed matter according to claim 1, wherein substantially all boundaries between said base pattern and said additional information pattern are at angles equal to or larger than said predetermined angle.

9. A printed matter comprising:
   a base pattern formed of a striped pattern having stripes at a predetermined interval; and
   an additional information pattern positioned inside said base pattern and having a striped pattern having stripes of substantially a same width and predetermined interval as said base pattern and a direction substantially parallel to a direction of said stripes of said base pattern, to provide a predetermined outline shape formed by discontinuous boundaries between stripes of said additional information pattern and said base pattern, wherein said additional information pattern is visually identified by putting thereon a reference pattern, printed on a transparent medium, to generate moiré of the base pattern and the additional information pattern, each pattern having its own moiré, wherein a boundary between said base pattern and said additional information pattern is arranged so that said striped patterns become discontinuous, and wherein the boundary is arranged at a predetermined angle with respect to a stripe direction of the striped patterns of said base pattern and said additional information pattern.

10. The printed matter according to claim 9 wherein said predetermined outline shape between said base pattern and said additional information is rotated relative to said base pattern and/or said additional information is deformed so that components of the boundary between the additional information pattern having the predetermined shape and the base pattern is minimized, said components of the boundary being parallel to the stripe direction of the striped pattern of the base pattern, and then said additional information is arranged so that the stripes of the striped pattern become discontinuous in the boundary between said additional information pattern and said base pattern.

11. The printed matter according to claim 10 wherein the striped pattern is a vertical striped pattern and said additional information pattern is one or more slanted characters.

12. The printed matter according to claim 10 wherein said additional information pattern is character or graphic information and wherein, after a part of characters or the graphics in the character or graphic information is deformed so that the direction of an outline of the characters or graphics in the character or graphic information becomes different from the stripe direction of the striped pattern as the additional information pattern.

13. The printed matter according to claim 9 wherein said additional information pattern includes an issue date or a time of the printed matter, a unique identification symbol or number, a personal name, or a predetermined symbol.

14. The printed matter according to claim 9 wherein the stripe direction of said base pattern and said additional information pattern is slanted so that a part parallel to a visible outline of the outline shape of said additional information pattern is minimized.

15. The printed matter according to claim 9 wherein visually identifiable information is printed with said base pattern in which said additional information pattern is embedded.

16. The printed matter according to claim 15 wherein an area in which the visually identifiable information is printed and an area in which the base pattern invisibly embedding therein the additional information pattern is printed are provided separately.

17. The printed matter according to claim 15 wherein the base pattern invisibly embedding therein the additional information pattern is provided as a ground pattern and wherein the visually identifiable information in a density different from the density of the base pattern is printed over the ground pattern in the base pattern.

18. The printed matter according to claim 9 wherein said base pattern and said additional information pattern are printed with at least a digital printer.

19. The printed matter according to claim 18 wherein an amount of a dislocation in the boundary between said base pattern and said additional information pattern is a minimum unit of resolution of said digital printer.

20. The printed matter according to claim 9, wherein substantially all boundaries between said base pattern and said additional information pattern are at angles equal to or larger than said predetermined angle.

21. A printed matter creation system comprising:
an accepting apparatus accepting a printed matter generation request;
means for distributing the printed matter generation request accepted via the accepting apparatus to a remote location;
editing means for editing predetermined printed matter contents having a base pattern formed of a striped pattern in response to the printed matter generation request;
additional information creating means for providing an additional information pattern having a striped pattern having stripes of substantially a same width and interval as said base pattern and having a direction substantially parallel to a direction of stripes of the base pattern, and rotating and/or deforming a an outline of said predetermined additional information pattern of the printed matter contents with respect to a base pattern;
additional information embedding means for providing said additional information pattern with a pattern corresponding to the base pattern and for invisibly embedding the additional information pattern in the base pattern;
means for distributing the printed matter contents embedded with said additional information pattern; and
a printer printing the distributed printed matter information.

22. The printed matter creation system according to claim 21, comprising:
a reference pattern generating means for generating a reference pattern corresponding to said base pattern, said reference pattern being used to visualize the additional information pattern invisibly embedded in said base pattern;
means for distributing said reference pattern; and
a reference pattern printing printer printing said reference pattern on a transparent medium.

23. The printed matter creation system according to claim 22 wherein said reference pattern generating means comprises:
additional information processing means for rotating or deforming the additional information so that components which form a shape of the additional information and which are parallel to a stripe direction of said base pattern are minimized; and
additional information converting means for converting said additional information to the striped pattern of said base pattern.

24. The printed matter creation system according to claim 21 wherein said printer is a digital printer.

25. The printed matter creation system according to claim 24 wherein an amount of a shift in a boundary between said base pattern and said additional information pattern is a minimum unit of resolution of said digital printer.

26. The printed matter creation system according to claim 21, wherein substantially all boundaries between said base pattern and said additional information pattern are at angles equal to or larger than a predetermined angle.

27. A print processor comprising:
editing means for editing predetermined printed matter contents having a base pattern including a striped pattern, in response to a printed matter generation request accepted via an accepting apparatus accepting the printed matter generation request;
an additional information embedding processor embedding an additional information pattern having a striped pattern having stripes of a same width and interval as said base pattern and having a direction substantially parallel to a direction of stripes of said base pattern, said base pattern being formed in said printed matter contents as a pattern of stripes at a predetermined interval, said additional information pattern being based on said generation request, said additional information pattern being processed so that, in a boundary between said base pattern and said additional information pattern, there is a predetermined dislocation between a striped pattern of said base pattern and the striped pattern of said additional information pattern and, in addition, the boundary is at an angle equal to or larger than a predetermined angle; and a charging unit calculating a fee of the printed matter, said fee being requested to generate in response to processing of said additional information.

28. The print processor according to claim 27 wherein said print processor is connected to said accepting apparatus via a network.

29. The print processor according to claim 27, comprising sending means for sending the fee calculated by said charging unit to said accepting apparatus via a network.

30. The print processor according to claim 27 wherein said print processor is connected to a printer via a network.

31. The print processor according to claim 27 wherein said print processor is connected to said accepting apparatus via a network, said accepting apparatus having a printer, and wherein said print processor sends print information, embedding therein the additional information, to said accepting apparatus.

32. The print processor matter according to claim 27, wherein substantially all boundaries between said base pattern and said additional information pattern are at angles equal to or larger than said predetermined angle.

* * * * *